(12) United States Patent
Anderton

(10) Patent No.: US 6,614,877 B2
(45) Date of Patent: Sep. 2, 2003

(54) METHOD AND APPARATUS FOR ENHANCING THE CONTRAST OF A MEDICAL DIAGNOSTIC IMAGE ACQUIRED USING COLLIMATION

(75) Inventor: R. Larry Anderton, West Jordon, UT (US)

(73) Assignee: GE Medical Systems Global Technology Company LLC, Waukesha, WI (US)

( * ) Notice: Subject to any disclaimer, the term of this patent is extended or adjusted under 35 U.S.C. 154(b) by 0 days.

(21) Appl. No.: 09/991,050

(22) Filed: Nov. 21, 2001

(65) Prior Publication Data
US 2003/0095627 A1 May 22, 2003

(51) Int. Cl.⁷ .................................................. H05G 1/64
(52) U.S. Cl. ...................................... 378/98.7; 378/147
(58) Field of Search ............................. 378/98.7, 147, 378/98.8, 95, 112

(56) References Cited

U.S. PATENT DOCUMENTS

| | | | |
|---|---|---|---|
| 4,489,426 A | 12/1984 | Grass et al. | |
| 5,436,829 A | 7/1995 | Hartley | |
| 5,574,764 A | 11/1996 | Granfors et al. | |
| 6,175,614 B1 * | 1/2001 | Jensen et al. | 378/98.7 |
| 6,208,710 B1 * | 3/2001 | Nagai | 378/108 |
| 6,377,656 B1 * | 4/2002 | Ueki et al. | 378/98.7 |
| 6,480,570 B1 * | 11/2002 | Ikeda | 378/98.7 |

* cited by examiner

Primary Examiner—Drew A. Dunn
Assistant Examiner—Irakli Kiknadze
(74) Attorney, Agent, or Firm—McAndrews, Held & Malloy, Ltd.; Peter J. Vogel; Michael A. Dellapenna

(57) ABSTRACT

An x-ray system that uses an x-ray source to irradiate a subject with x-rays is provided. A collimator is located proximate to the x-ray source and blocks a portion of the x-rays. A detector receives the x-rays and creates subject data indicative of a subject and collimator data indicative of a collimator. A position detector identifies a position of the collimator with respect to a field of view of the x-ray source. A gating module receives the subject and collimator data and passes at least a portion of the subject data. The gating module blocks at least a portion of the collimator data based on the position of the collimator. A display displays an x-ray image based on the portion of the subject data passed by the gating module.

22 Claims, 5 Drawing Sheets

METHOD AND APPARATUS FOR ENHANCING THE CONTRAST OF A MEDICAL DIAGNOSTIC IMAGE ACQUIRED USING COLLIMATION

BACKGROUND OF THE INVENTION

Certain embodiments of the present invention relate to medical diagnostic systems, and in particular, to techniques and apparatus for adjusting the contrast of displayed diagnostic images acquired while using a collimator.

X-ray systems are well known for creating a series of internal images of a patient, such as cardiology, radiology and fluoroscopy systems. The patient is exposed to x-rays which are then detected after passing through the patient. The radiation is pulsed to produce a continuous sequence of images which are displayed real-time on a monitor. The x-rays are attenuated as they pass through the patient. The amount of attenuation experienced by the x-rays is represented in the image by the grayscale level of the pixels that are displayed. The contrast between grayscale levels is representative of the amount of attenuation.

Bones and different types of tissues attenuate the x-rays by different amounts, and thus are detected and displayed on an image monitor with different contrast levels. For example, bone will attenuate x-ray to a larger degree than muscle and may be displayed darker than surrounding anatomy. A region of anatomy containing only soft tissue may have a smaller range of contrast than a region of anatomy containing both soft tissue and bone. In addition, scattered radiation or using an increased kVp level to image a very large patient may also decrease the contrast range.

The level of radiation detected by the system is correlated to the contrast of the displayed image by a look-up table, or transfer function. In other words, the system uses the transfer function to assign a specific level of radiation to a specific grayscale level of the display. The system varies the range of the contrast for the displayed image associated with a particular range of grayscale levels by changing the shape (e.g., slope, offset, etc.) of the transfer function. The system may have multiple transfer functions, representing different mathematical models or shapes, from which one transfer function is selected to control the contrast of one or more display images. A particular transfer function is selected for different procedures or when imaging different anatomy.

The range of contrast used to display multiple images during a procedure may be set by the system and remain constant throughout the procedure. Therefore, a level of detected radiation, or a particular brightness level, is assigned a particular grayscale level for one or an entire series of scans. This is not advantageous, as during the same procedure, areas of interest within a patient which have various ranges of contrast may be scanned, and thus the contrast may appear to fluctuate. Some images may appear with a high level of contrast, containing areas that are very dark and areas that are very light, while other images may have low contrast and appear light or washed out. An operator may chose to adjust the contrast of the displayed image to correct for the change in contrast in the anatomy, but this is time consuming, error prone, and would need to be repeated as different tissues are examined.

To provide a more constant contrast throughout a procedure (fluoroscopic, cardiology, radiology or otherwise), automatic contrast compensation algorithms have been proposed. Automatic contrast compensation, or contrast management, is utilized to present a more pleasing image with better diagnostic utility. The images are examined for maximum and minimum brightness levels as they are acquired. The maximum and minimum brightness levels are then used to determine a new grayscale transfer function to enhance the contrast of the displayed image. Therefore, a radiologist may view images that contain bone and images containing only soft tissue during the same procedure without manually adjusting the contrast.

Unfortunately, automatic contrast compensation algorithms are also sensitive to data from regions where radiation has been blocked, such as when a collimator is used. A collimator may be used to block a portion or portions of an x-ray beam to minimize exposure to areas of the body which are not of diagnostic interest. When using a collimator, automatic contrast compensation, when enabled, identifies a minimum brightness level and adjusts the contrast such that the data detected from the collimator is assigned the lower end of the available grayscale, or the minimum brightness levels. Therefore, the grayscale range available to display the anatomic region of interest is decreased, and the displayed anatomic data reflects a sudden decrease in contrast.

In an effort to eliminate the effect of the collimator, it has been proposed to determine the maximum and minimum brightness levels from a small area of an image that will never be obstructed by the collimator regardless of where the collimator is actually located. Unfortunately, controlling brightness levels based on a smaller portion of the field of view may compromise contrast enhancement for larger fields of view, such as when no collimator or a less obstructive collimator is used. This method results in anatomic grayscale data being lost when imaging high contrast anatomy.

Thus, a need exists in the industry for a method and apparatus for adjusting the contrast of displayed diagnostic images when a collimator is used that addresses the problems noted above and previously experienced.

BRIEF SUMMARY OF THE INVENTION

In accordance with at least one embodiment, an x-ray system is provided utilizing an x-ray source that irradiates a subject with x-rays. A collimator is located proximate to the x-ray source and blocks a portion of the x-rays. A detector receives the x-rays from the x-ray source and creates subject data indicative of a subject and collimator data indicative of a collimator. A position detector identifies a position of the collimator with respect to a field of view of the x-ray source. A gating module receives the subject and collimator data and passes at least a portion of the subject data. The gating module blocks at least a portion of the collimator data based on the position of the collimator. A display displays an x-ray image based on at least a portion of the subject data passed by the gating module.

In accordance with at least one embodiment, an x-ray system is provided utilizing an x-ray source to irradiate a subject with x-rays. A collimator blocks a portion of the x-rays and is located proximate the x-ray source. A detector receives x-rays from the x-ray source and creates subject data indicative of a subject and collimator data indicative of a collimator. A collimator calculation module identifies at least one of a position, an orientation, a shape, and a boundary of the collimator based on the position of the collimator. A gating module receives the subject and collimator data, and passes at least a portion of the subject data and blocks at least a portion of the collimator data based on the position of the collimator. A display displays an x-ray image based at least on the portion of the subject data passed by the gating module.

In accordance with at least one embodiment, a method for enhancing the contrast of an x-ray image is provide. A subject is exposed to an x-ray source which is partially blocked by a collimator. Subject data indicative of a subject and collimator data indicative of a collimator is detected. Position data indicative of a position of the collimator is identified. The subject and collimator data is gated to block the collimator data based on the position data. An x-ray image is displayed based on at least a portion of the subject data.

The foregoing summary, as well as the following detailed description of the embodiments of the present invention, will be better understood when read in conjunction with the appended drawings. It should be understood, however, that the present invention is not limited to the arrangements and instrumentality shown in the attached drawings.

DETAILED DESCRIPTION OF THE INVENTION

Figure 1:
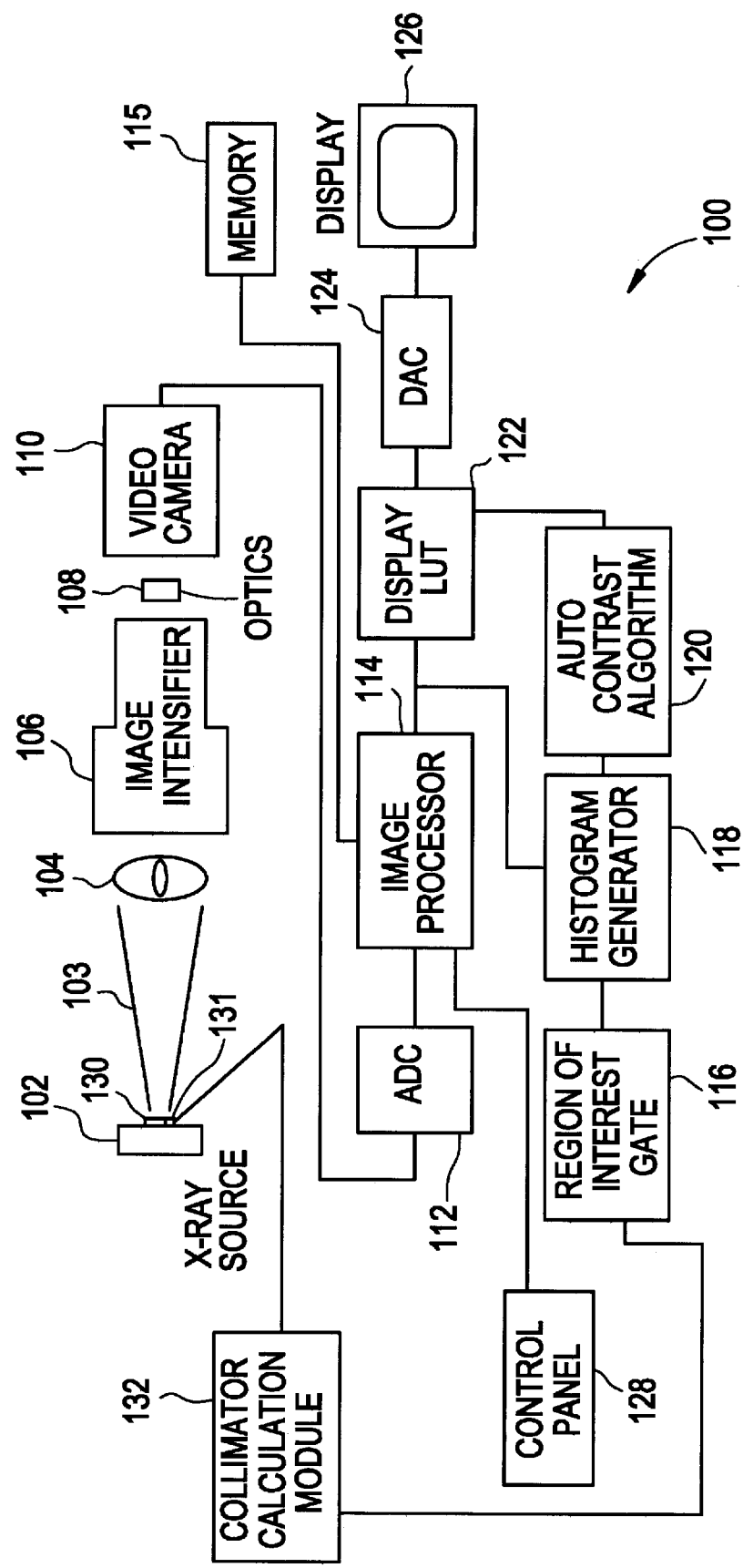
FIG. 1 illustrates a fluoroscopic x-ray system that utilizes automatic contrast compensation in accordance with an embodiment of the present invention.

FIG. 1 illustrates a fluoroscopic x-ray system that utilizes automatic contrast compensation in accordance with an embodiment of the present invention. The fluoroscopic system 100 includes an x-ray source 102 which directs an x-ray beam 103 toward a subject or patient 104. The patient 104 may be a human, animal, test phantom, or other object which includes anatomic structure. The image intensifier 106 detects the radiation that passes through the patient 104 and produces an image. The image is transferred via optics 108 to a CCD video camera 110. The CCD video camera 110 produces an analog video signal which is converted to a digital signal by an analog to digital converter (ADC) 112. Optionally, the ADC 112 may be included in the CCD video camera 110. Alternatively, a flat panel detector may replace the image intensifier 106, the optics 108 and the CCD video camera 110. The digital signal is then sent to the image processor 114. A memory 115 may be utilized to store the digital signal data and other data utilized by the fluoroscopic system 100.

The fluoroscopic system 100 includes a region of interest (ROI) gate 116, a histogram generator 118, and an auto contrast algorithm 120 that cooperate to perform automatic contrast compensation. The ROI gate 116, histogram generator 118 and auto contrast algorithm 120 are displayed separately on FIG. 1 but may constitute software, all of which is performed by the image processor 114 or other component of the fluoroscopic system 100. Alternatively, separate hardware such as individual digital signal processing boards may carry out the functions of the ROI gate 116, histogram generator 118 and auto contrast algorithm 120. A control panel 128 may be utilized by an operator to input data, such as to enable automatic contrast compensation or enter patient data.

A collimator 130 may be utilized to block a portion or portions of the x-ray beam 103. The collimator 130 may be comprised of one or more leaves. A detector 131 detects the position of the collimator 130. The collimator calculation module 132 reads the collimator position data and utilizes the collimator position data to calculate a region of interest. The region of interest may define an area of acquired data upon which a displayed image is based. The region of interest may be used by the ROI gate 116 to identify portions of the acquired data to block. Therefore, the blocked data may not affect the histogram generated by the histogram generator 118. The auto contrast algorithm 120 identifies maximum and minimum values in the histogram. The output of the auto contrast algorithm 120 is passed to a display look-up table (LUT) 122. The display LUT 122 uses the parameters identified by the auto contrast algorithm 120 and correlates the levels of detected radiation in the digital image data from the image processor 114 to a selected look-up table, or transfer function. A digital to analog converter (DAC) 124 converts the output of the display LUT 122 from digital to analog, and passes the analog signal to display 126. The display 126 then displays a diagnostic image of the patient 104.

Figure 2:
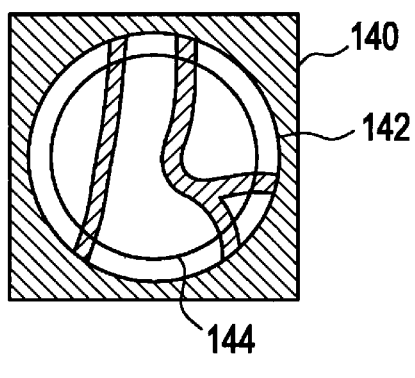
FIG. 2 illustrates a diagnostic image acquired without utilizing a collimator in accordance with an embodiment of the present invention.

FIG. 2 illustrates a diagnostic image acquired without utilizing a collimator in accordance with an embodiment of the present invention. A monitor 140 or similar device displays a diagnostic image 142 such as that displayed by display 126. The region of interest gate 116 utilizes predefined parameters or data from the collimator calculation module 132 to block digital image data outside a region of interest 144. The region of interest 144 is a part of the diagnostic image 142, and is typically 60 percent to 100 percent of the diameter of the diagnostic image 142. For example, the region of interest 144 may be fixed at 90 percent. The diagnostic data within the region of interest 144 will be used by the histogram generator 118 to build a histogram.

Figure 3:
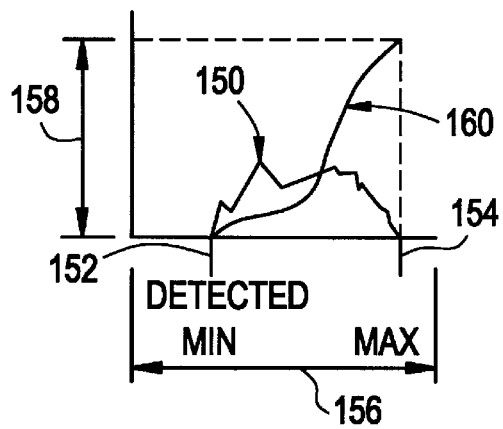
FIG. 3 illustrates a histogram and a transfer function generated from a region of interest in accordance with an embodiment of the present invention.

FIG. 3 illustrates a histogram and a transfer function generated from a region of interest in accordance with an embodiment of the present invention. The histogram generator 118 utilizes the digital image data output from the image processor 114 inside the region of interest 144 over a raw data range 156 to generate a histogram 150. The digital image data used to construct histogram 150 does not include digital image data located in regions covered by collimator 130. The auto contrast algorithm 120 determines the detected minimum value (detected MIN) 152 and the maximum value (MAX) 154 within the histogram 150 of the digital image data. The display LUT 122 utilizes the detected MIN 152 and MAX 154 values to generate a transfer function 160 over the displayed contrast range 158.

By way of example only, the displayed contrast range 158 may be divided into 256 discreet grayscale levels, wherein 0 indicates black and 255 indicates white. In a typical fluoroscopic system, the average values of the region of interest 144 may be displayed in the upper half of the displayed contrast range 158. For example, the brighter elements of the image may be displayed with a value in the range of 180 to 200, while the darkest elements may be displayed in the range of 50 to 100.

The histogram generator 118 may be comprised of a table of values stored in the memory 115 to which the digital image data is compared. Alternatively, the histogram generator 118 may use other electronic circuitry to detect the various white, black, and gray levels in the digital image data. The peak white (maximum) and peak black (minimum) signals may be used to generate offset and gain values to drive analog circuitry. The analog circuitry may be combined with an analog gate or clipping circuit, for example, that would reject black values below a certain level identified by the operator through the control panel 128.

The histogram generator 118 plots the histogram 150 on a graph such that the horizontal axis represents the level of detected radiation inside the region of interest 144 for the digital image data over the raw data range 156, and the vertical axis represents the displayed contrast range 158 available on the display 126. The displayed contrast range 158 may be a grayscale from black to white. Alternatively, the displayed contrast range 158 may be represented by a color scale, in which each color indicates a level, or band of levels, of signal value or detected radiation. The histogram generator 118 may plot each pixel's value in the histogram 150. Optionally, the digital image data may be divided into groups of pixels, such as a square of 10 pixels, and the average value of each group of pixels may be plotted. The histogram generator 118 may plot a histogram 150 for each individual image that is acquired, or for a certain percentage of the images that are acquired.

Once the histogram 150 is generated, the auto contrast algorithm 120 determines the detected MIN 152 and MAX 154 values within the raw data range 156. The detected MIN 152 is the lowest detected value in the region of interest 144, or the point(s) in the region of interest 144 with the least detected radiation. Pixels with detected radiation at or below the detected MIN 152 may be represented by the darkest element of the grayscale (i.e. black, or approaching black) on the display 126. The MAX 154 is the highest detected value in the region of interest 144 and indicates the points(s) with the most detected radiation. A pixel with detected radiation at or above the MAX 154 may be represented by the brightest element (i.e. white) on the display 126.

Additionally, the histogram 150 may be further filtered to eliminate discrepant values. For example, in order to identify the detected MIN 152, the auto contrast algorithm 120 may set a condition which must be met, such as having 10 values in a row plotted on the histogram 150 with greater than a predetermined number of pixels. Similar restrictions may be placed on the upper end to determine the MAX 154. Therefore, noise present at the minimum and maximum ends of the histogram 150 may not be considered. Alternatively, the auto contrast algorithm 120 may set a condition such that the gradient or slope of the histogram 150 may be below a predefined level as the histogram 150 approaches and combines with the threshold of 1% amplitude. Optionally, a convolving kernel or window may be utilized to smooth the histogram 150 with a spline or cubic function before the detected MIN 152 and MAX 154 are identified. It should be understood that further methods exist to identify the detected MIN 152 and MAX 154 values in the histogram 150, and any appropriate method may be utilized.

After the detected MIN 152 and MAX 154 have been identified, the display LUT 122 draws the transfer function 160 from the detected MIN 152 to the MAX 154 and translates the radiation levels of the histogram 150 to occupy the full contrast range of the display 126. Therefore, detected MIN 152 is typically assigned a value of zero or near zero on the vertical axis and MAX 154 is assigned a value of 255 on the vertical axis. The transfer function 160 may be stored in memory 115 and is illustrated as non-linear, but it should be understood that any transfer function may be used. For example, the transfer function may be linear (such as the transfer function 184 illustrated in FIG. 5), logarithmic, exponential, S-shaped, hyperbolic tangent, or another shape that may not fit any mathematical model.

Figure 4:
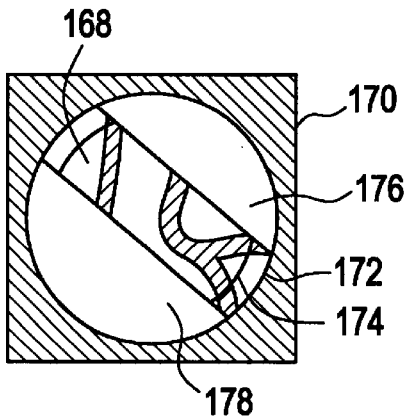
FIG. 4 illustrates a diagnostic image acquired utilizing a collimator in accordance with an embodiment of the present invention.

FIG. 4 illustrates a diagnostic image acquired utilizing a collimator in accordance with an embodiment of the present invention. FIG. 4 incorporates similar components as illustrated in FIG. 2, such as a monitor 170, diagnostic image 172, and region of interest 174. The diagnostic image 172 is comprised of an area of subject data 168 and areas of collimator data 176 and 178. Because the leaves of the collimator 130 are opaque, little or no radiation is transmitted through the leaves.

Figure 5:
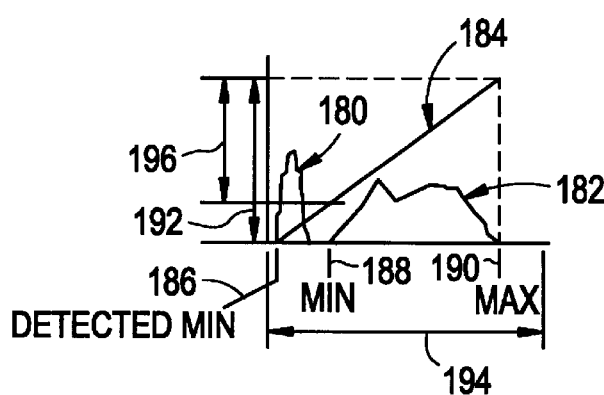
FIG. 5 illustrates two histograms and a transfer function generated from detected radiation in a region of interest including collimator leaves in accordance with an embodiment of the present invention.

FIG. 5 illustrates two histograms and a transfer function generated from detected radiation in a region of interest including collimator leaves in accordance with an embodiment of the present invention. The histogram generator 118 utilizes the raw data range 194 from the region of interest 174 to build histograms 180 and 182. Histogram 180 is a first distribution of the collimator data 176 and 178 from the collimator leaves. The detected MIN 186 is the lowest radiation level detected in the raw data range 194. Histogram 182 is a second distribution of the subject data 168 of the subject or patient 104 similar to histogram 150 of FIG. 3.

When a collimator 130 is used, the auto contrast algorithm 120 identifies the detected MIN 186 as the lowest detectable radiation. The display LUT 122 then generates the transfer function 184 based upon the detected MIN 186 and the MAX 190 with a displayed contrast range 192. The collimator data 176 and 178 is represented by the lower level of the transfer function 184, and subject data 168 is pushed into the upper level of the transfer function 184. Thus, the subject data 168 is displayed with contrast range 196, which is less than the displayed contrast range 192.

Figure 6:
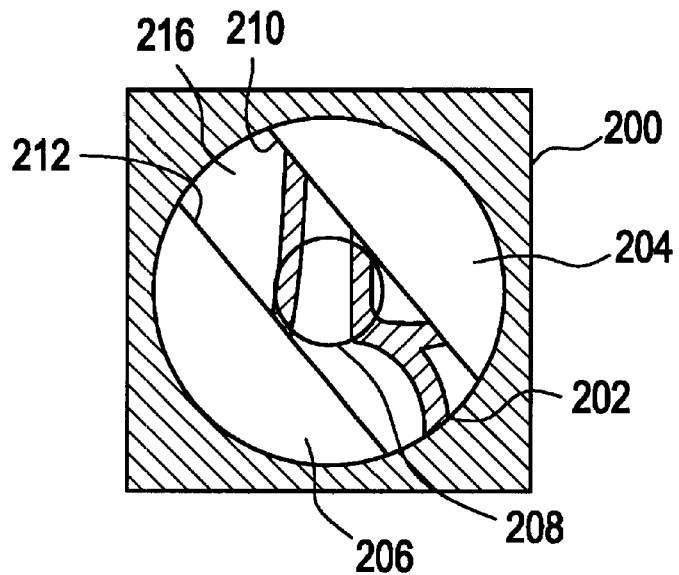
FIG. 6 illustrates a diagnostic image acquired utilizing a collimator and collimator position data in accordance with an embodiment of the present invention.

FIG. 6 illustrates a diagnostic image acquired utilizing a collimator and collimator position data in accordance with an embodiment of the present invention. FIG. 6 incorporates similar components as illustrated in FIG. 4, such as a monitor 200, diagnostic image 202, subject data 216, and collimator data 204 and 206. The region of interest 208, however, has been calculated utilizing data provided by the detector 131. Because the leaves of the collimator 130 are symmetrical, the region of interest 208 may be at the center of the diagnostic image 202, illustrated just inside the collimator data 204 and 206. Therefore, the region of interest 208 contains only subject data 216, and may not be impacted by the orientation of the collimator 130.

The region of interest 208 of FIG. 6 has been illustrated as a circle centered within the diagnostic image 202 and inside the collimator data 204 and 206. However, the region of interest 208 may be any size or shape, such as a rectangle defined by collimator edges 210 and 212. The region of interest 208 may then contain all or nearly all of the subject data 216. Alternatively, the operator may define the size and/or shape of the region of interest 208, then use the control panel 128 to move the region of interest 208 within the area defined by the collimator edges 210 and 212 in order to choose the subject data 216. Thus, the operator may be able to further control the contrast of the subject data 216 displayed by display 126.

Figure 7:
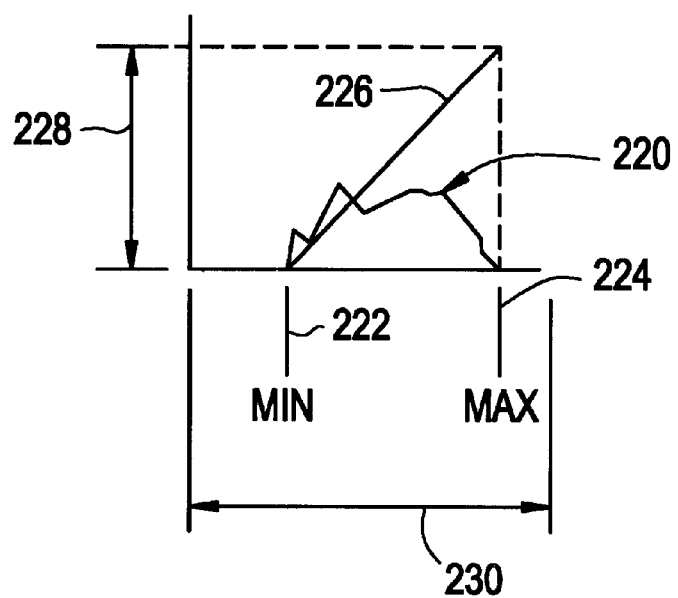
FIG. 7 illustrates a histogram and transfer function utilizing collimator position data in accordance with an embodiment of the present invention.

FIG. 7 illustrates a histogram and transfer function utilizing collimator position data in accordance with an embodiment of the present invention. Histogram 220 represents subject data 216 acquired within region of interest 208, which comprises raw data range 230. As illustrated in FIG. 6, region of interest 208 includes a portion of subject data 216, but does not include collimator data 204 and 206. The auto contrast algorithm 120 determines MIN 222 and MAX 224 corresponding to histogram 220. The display LUT 122 then draws a transfer function 226 from the MIN 222 to the MAX 224. By using collimator position data to identify a region of interest 208 that does not include collimator data 204 and 206, the transfer function 226 maximizes the use of the displayed contrast range 228 by assigning collimator data 204 and 206 (data below MIN 222) a black or nearly black value.

It may not be desirable to use the maximum grayscale values for black and white when displaying diagnostic data. Therefore, moderation values may be utilized by the auto contrast algorithm 120 to moderate the maximum and minimum values used by the display LUT 122. As a result, values below MIN 222 may be assigned a black, or nearly black, value, differentiating the data below MIN 222 from the anatomic data.

Figure 8:
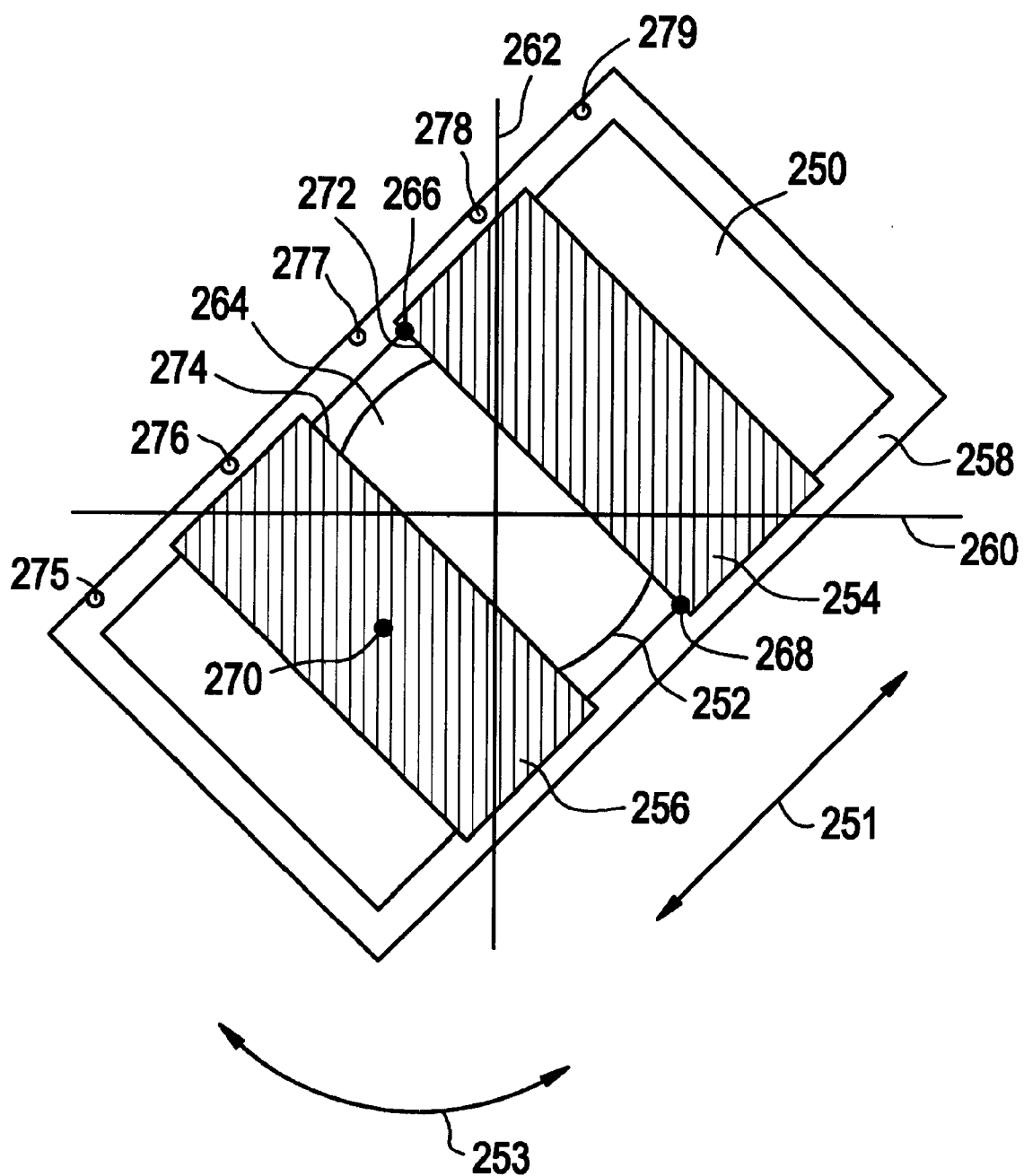
FIG. 8 illustrates a collimator and x-ray source in accordance with an embodiment of the present invention.

FIG. 8 illustrates a collimator and x-ray source in accordance with an embodiment of the present invention. A collimator 250 is fastened to an x-ray source 252 such that the collimator 250 is between the x-ray source 252 and the patient 104, as illustrated in FIG. 1. The collimator 250 may be comprised of one or more collimator leaves 254 and 256 and a frame 258. The collimator 250 may be placed within an x-y plane, such as the plane defined by x-axis 260 and y-axis 262. Therefore, the collimator 250 may be rotated relative the x-axis 260 and the y-axis 262. Alternatively, the collimator 250 may be constructed to permit the collimator leaves 254 and 256 to rotate within the frame 258.

The collimator leaves 254 and 256 may be rectangular in shape, resulting an a substantially rectangular exposure area 264. Alternatively, the collimator leaves 254 and 256 may be another shape to provide a circular, keyhole, or square exposure area 264, for example. By way of example only, the collimator leaves 254 and 256 may move toward and away from one another along a linear path 251, or may be rotated along a circular path 253. The collimator frame 258 may contain one or more position sensors 275-279 which sense the location of the collimator leaves 254 and 256. The position sensors 275279 may be electromagnetic, mechanical, optical, or any other type of sensor. The collimator leaves 254 and 256 may be fixed to a specified position within frame 258, or may be adjusted by the operator to increase, decrease, or change the shape of the exposure area 264. It may be possible to move one collimator leaf 254 or 256, or the collimator leaves 254 and 256 may be fixed such that each collimator leaf 254 and 256 obstructs a substantially similar sized portion of the exposure area 264.

By way of example only, when the collimator 250 is attached to the x-ray source 252, one or more position sensors 275-279 within the collimator 250 sense the position of one or more collimator leaves 254 and 256. The collimator calculation module 132 reads position data from the position sensors 275-279 and utilizes the position data to calculate the position of the collimator leaves 254 and 256 relative to the x-axis 260 and y-axis 262. The position of the collimator leaves 254 and 256 may be identified by reading the location of one edge of a collimator leaf 254 or 256, such as marker 266 or 268. One marker 266 or 268 may be utilized if the associated position sensor 275-279 provides data identifying an x value, a y value, and a rotation value. Alternatively, the position of a collimator leaf 254 or 256 may be identified by sensing a position within the collimator leaf 254 or 256, such as marker 270. Marker 270 may be the center of the collimator leaf 256, for example, and provide a reference as to the location of collimator leaf 256 in relation to the x-axis 260 and y-axis 262. If more than one marker 266–270 is used to identify the location of a collimator leaf 254 or 256, the collimator calculation module 132 may utilize x and y coordinate data relative to the x-axis 260 and the y-axis 262 provided by the position sensors 275-279 to calculate an associated angle. It should be understood that the location and number of markers 266–270 and collimator sensors 275-279 in FIG. 8 is exemplary. Therefore, one or more markers 266–270 may be located elsewhere on collimator leaves 254 and 256, and one or more collimator sensors 275-279 may be located elsewhere on collimator 250.

The collimator calculation module 132 may convert the position data to a numeric number set. The number set may comprise coordinate data, such as in a bit map, configured to store displayed digital image data. The collimator calculation module 132 may use the coordinate data to "draw" the location of each collimator leaf 254 and 256 into the bit map. The orientation of the collimator leaves 254 and 256 may be identified relative to a reference coordinate within the bit map. The shape of the collimator leaves 254 and 256 may also be identified. As discussed above, the shape of the collimator leaves 254 and 256 is not limited to a rectangle. By identifying the orientation, shape, and/or location of the collimator leaves 254 and 256, the boundaries 272 and 274 of the collimator leaves 254 and 256 may be identified. Therefore, the size, location, and shape of exposure area 264, which is inside the boundaries 272 and 274, is known.

Once the exposure area 264 is identified, the collimator calculation module 132 may calculate a region of interest 208, as illustrated in FIG. 6. The region of interest 208 is defined as a circle within the exposure area 264. As discussed previously, the region of interest 208 may be any shape and/or size, and may be located anywhere within the exposure area 264. For example, the region of interest 208 may include all digital image data within the exposure area 264. Therefore, all of the digital image data within the region of interest 208 may be utilized to adjust the contrast of the displayed diagnostic image 202.

Figure 9:
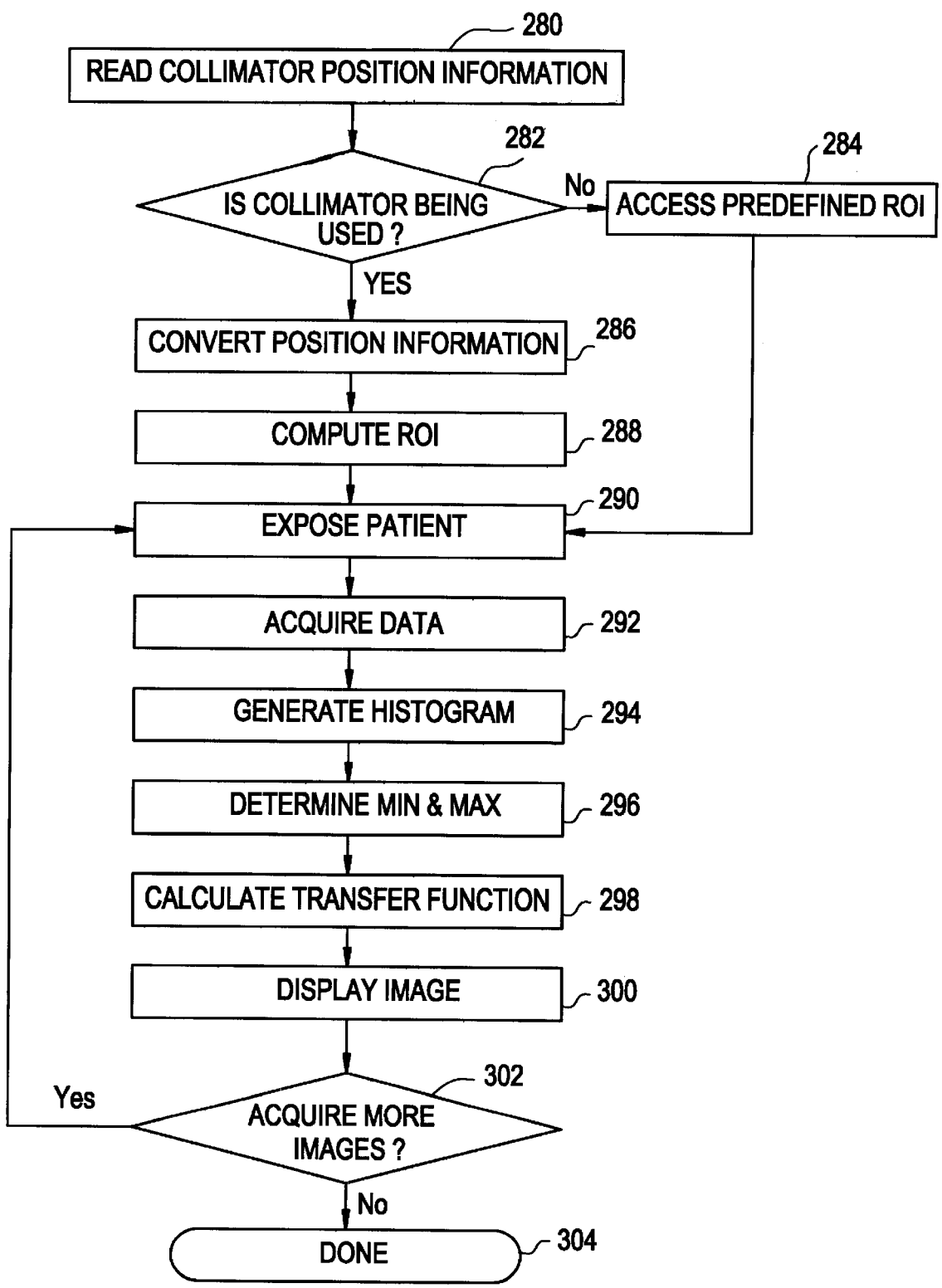
FIG. 9 illustrates a method for enhancing the contrast of diagnostic images acquired using automatic contrast compensation and a collimator in accordance with an embodiment of the present invention.

FIG. 9 illustrates a method for enhancing the contrast of diagnostic images acquired using automatic contrast compensation and a collimator in accordance with an embodiment of the present invention. For the method of FIG. 9, the auto contrast option is enabled. For example, the auto contrast option may be enabled through a keyboard or other control panel 128 as previously discussed. In addition, a look-up table used by the display LUT 122 to calculate the transfer function is predefined and may be stored in memory 115.

At step 280, the collimator calculation module 132 reads the collimator position information from the position sensors 275–279. As discussed previously, the position of the collimator leaves 254 and 256 may be identified by one or more position sensors 275–279. The collimator position information may be in the form of a collimator marker 266–270, where one or more collimator markers 266–270 are used to identify the position, orientation, and shape of the collimator leaves 254 and 256.

At step 282, the collimator calculation module 132 determines whether a collimator 250 is being used. If no collimator position information was read from the position sensors 275–279, the flow passes to step 284. At step 284, the collimator calculation module 132 may access a predefined region of interest 174. Therefore, the region of interest 174 may be assigned a size of 90 percent of the diameter of the diagnostic image 172, as previously discussed. The predefined region of interest 174 may be stored in memory 115. If collimator position information is available, the flow passes to step 286.

At step 286, the collimator calculation module 132 converts the collimator position information to a numeric number set. As previously discussed, the number set may comprise coordinate data in a bit map. The coordinate data identifying the location of the collimator leaves 254 and 256 is then drawn into the bit map.

At step 288, the collimator calculation module 132 utilizes the numeric number set and/or bit map to compute the region of interest 208. The boundaries 272 and 274 may be identified, thus defining the exposure area 264. The region of interest 208 is computed to be within the exposure area 264, based upon size and shape parameters identified by the collimator calculation module 132. Once the region of interest 208 has been computed, the region of interest 208 is sent to the ROI gate 116.

At step 290, x-ray source 102 exposes the patient 104 to x-ray radiation. The level of x-ray may be determined by the anatomy being imaged, the type of procedure, or the size of the patient 102, for example. At step 292, the image intensifier 106, the optics 108, the video camera 110, the ADC 112, and the image processor 114 are utilized to acquire digital image data that may be displayed as diagnostic image 202. The digital image data may be stored in a memory 115 to be further processed later.

At step 294, the histogram generator 188 generates one or more histograms based upon the digital image data within the region of interest 208, such as the region of interest 208 computed in step 288. Digital image data outside the region of interest 208 is "gated" or excluded by the ROI gate 116 from the histogram generation. As stated previously, the histogram generator 118 may generate one or more histograms for each acquired image, or combine more than one acquired image to generate a histogram.

At step 296, the auto contrast algorithm 120 determines the minimum and maximum values of the raw data range 230 within the region of interest 208. For example, MIN 222 and MAX 224 may be determined, such as in FIG. 7. Next, at step 298, the display LUT 122 utilizes the predetermined look-up table and the MAX 224 and MIN 222 values of step 296 to calculate transfer function 226. The transfer function 226 may associate the histogram 220 with a grayscale level, or displayed contrast range 228.

At step 300, the display 126 displays the diagnostic image 202 by applying the transfer function 226 to the digital image data from the image processor 114. The MIN 222 of step 296 may be displayed as nearly black, while the MAX 224 may be displayed as white. As discussed previously, a color scale may also be used. The collimator is displayed at black, or approaching black. Therefore, the anatomic data may be displayed with nearly the full displayed contrast range 228.

At step 302, the method determines whether more diagnostic images 202 are to be acquired. If yes, the flow returns to step 290. If no, flow passes to step 304 and the method is complete.

By using the aforementioned methods and apparatus to acquire diagnostic images 202 while using a collimator 130 to block a portion of the x-ray beam 103, diagnostic images 202 with improved diagnostic utility may be acquired. Therefore, a fluoroscopic system 100 that utilizes collimator position data together with the auto contrast option will able a radiologist to conduct a procedure comprising multiple x-ray images utilizing the benefits of auto contrast without the disadvantage of displaying anatomic data with a reduced contrast range.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. An x-ray system, comprising:
   an x-ray source irradiating a subject with x-rays;
   a collimator located proximate said x-ray source blocking a portion of said x-rays;
   a detector receiving x-rays from said x-ray source and creating subject data indicative of a subject and collimator data indicative of said collimator;
   a position detector identifying a position of said collimator with respect to a field of view of said x-ray source;
   a collimator calculation module computing a region of interest based on said position of said collimator;
   a gating module receiving said subject and collimator data, said gating module at least passing a portion of said subject data, said gating module blocking at least a portion of said collimator data based on said region of interest; and
   a display displaying an x-ray image based at least on said portion of said subject data passed by said gating module.

2. The x-ray system of claim 1, further comprising a histogram generator creating a histogram of said portion of said subject data, said histogram affecting display of said x-ray image.

3. The x-ray system of claim 1, further comprising a histogram generator creating a histogram including said subject data and excluding said collimator data.

4. The x-ray system of claim 1, further comprising a contrast module automatically adjusting contrast of said display independent of said collimator data.

5. The x-ray system of claim 1, wherein said gating module passes all subject data created by said x-ray source and said detector.

6. The x-ray system of claim 1, wherein said gating module blocks at least said portion section of said subject data outside said region of interest.

7. The x-ray system of claim 1, wherein said gating module passes only said subject data within said region of interest.

8. The x-ray system of claim 1, wherein said gating module blocks all said subject and collimator data outside said region of interest.

9. The x-ray system of claim 1, said collimator calculation module identifying, as a collimator marker, at least one of a position, an orientation, a shape and a boundary of said collimator based on said position of said collimator, said gating module blocking said collimator data based on said collimator marker.

10. The x-ray system of claim 1, said collimator calculation module identifying a border between said collimator data and said subject data based on said position of said collimator, said gating module blocking said collimator data based on said border.

11. An x-ray system, comprising:

an x-ray source irradiating a subject with x-rays;

a collimator located proximate said x-ray source blocking a portion of said x-rays;

a detector receiving x-rays from said x-ray source and creating subject data indicative of a subject and collimator data indicative of said collimator;

a collimator calculation module identifying an exposure area based on at least one of a position, an orientation, a shape and a boundary of said collimator;

a gating module receiving said subject and collimator data, said gating module passing at least a portion of said subject data based on said exposure area; and a display displaying an x-ray image based at least on said portion of said subject data passed by said gating module.

12. The x-ray system of claim 11, further comprising a histogram generator creating a histogram including said subject data and excluding said collimator data.

13. The x-ray system of claim 11, wherein said gating module blocks a section of said subject data outside a region of interest, said region of interest being based on said exposure area.

14. The x-ray system of claim 11, wherein said gating module defines a region of interest substantially similar to said subject data.

15. The x-ray system of claim 11, wherein said boundary defines a border between said collimator data and said subject data, said gating module blocking said collimator data based on said border.

16. The x-ray system of claim 11, further comprising a contrast module automatically identifying minimum and maximum grayscale values for said subject data.

17. A method for enhancing the contrast of an x-ray image, the method comprising:

exposing a subject to an x-ray source, said x-ray source being partially blocked by a collimator;

detecting subject data indicative of a subject and collimator data indicative of the collimator;

identifying position data indicative of a position of the collimator;

computing a region of interest based on said position data;

gating said subject and collimator data to block said collimator data based on said position data; and displaying an x-ray image based on at least a portion of said subject data.

18. The method of claim 17, said gating step further comprising blocking a portion of said subject data.

19. The method of claim 17, further comprising automatically calculating minimum and maximum grayscale values based on at least a portion of said subject data, said minimum and maximum grayscale values utilized to display said x-ray image.

20. The method of claim 17, wherein said position data comprises at least one of a position, an orientation, a shape and a boundary of said collimator.

21. The method of claim 17, said computing stop further comprising a portion of said subject data being inside said region of interest and all of said collimator data being outside said region of interest.

22. The method of claim 17, further comprising automatically calculating minimum and maximum grayscale values utilized to display said x-ray image, said minimum and maximum grayscale values identified independent of said collimator data.

\* \* \* \* \*